(12) United States Patent
Koryakin et al.

(10) Patent No.: US 7,506,096 B1
(45) Date of Patent: Mar. 17, 2009

(54) MEMORY SEGMENT EMULATION MODEL FOR VIRTUAL MACHINE

(75) Inventors: Alexey B. Koryakin, Moscow (RU); Nikolay N. Dobrovolskiy, Moscow (RU); Andrey A. Omelyanchuk, Moscow (RU); Alexander G. Tormasov, Moscow (RU); Serguei M. Beloussov, Singapore (SG); Stanislav S. Protassov, Moscow (RU)

(73) Assignee: Parallels Software International, Inc., Tortola (VG)

( * ) Notice: Subject to any disclaimer, the term of this patent is extended or adjusted under 35 U.S.C. 154(b) by 307 days.

(21) Appl. No.: 11/538,444

(22) Filed: Oct. 4, 2006

Related U.S. Application Data (60) Provisional application No. 60/723,931, filed on Oct. 6, 2005.

(51) Int. Cl.
 *G06F 12/00* (2006.01)

(52) U.S. Cl. .............................. 711/6; 711/202; 711/206

(58) Field of Classification Search .................... 711/6, 711/163, 202, 206
See application file for complete search history.

(56) References Cited

U.S. PATENT DOCUMENTS

2007/0294496 A1* 12/2007 Goss et al. .................. 711/163

* cited by examiner

*Primary Examiner*—Hyung S Sough
*Assistant Examiner*—Mehdi Namazi
(74) *Attorney, Agent, or Firm*—Bardmesser Law Group (57) ABSTRACT

A method of emulating segment addressing by a processor that includes initiating a Virtual Machine Monitor in a kernel mode; initiating a Virtual Machine in a user mode; forming a dynamically mapped table in Virtual Machine Monitor space, the dynamically mapped table corresponding to a table of segment descriptors of the Virtual Machine; populating the dynamically mapped table with descriptors that raise exceptions upon an attempt by the Virtual Machine to address a corresponding segment; and mapping a descriptor to the dynamically mapped table upon the Virtual Machine's use of that descriptor.

23 Claims, 7 Drawing Sheets

| Short name | Mode flags | Native executed segment registers | Emulated seg. registers | Comment |
|---|---|---|---|---|
| Full emulated segment emulation mode | NOT map | 0 | ES, CS, SS, DS, FS, GS | Default model.<br>All loading segment register operations are emulated.<br>Used for RM, and some rare modes |
| Full native segment emulation mode without mapping | NOT map | ES, CS, SS, DS, FS, GS | 0 | Loading segment register operations are executed natively. No one descriptor is mapped.<br>Used for V8086 mode |
| Full native segment emulation mode with descriptor mapping (for CPL=3) | Map | ES, CS, SS, DS, FS, GS | 0 | Loading segment register operations are executed natively. Descriptor for any segment register is mapped.<br>Used for PM3 (native executed) mode |
| Native segment emulation mode with descriptor mapping (for CPL = 0) | Map | ES, DS, FS, GS | CS, SS | Loading segment register operations are executed natively excepting CS, SS. Descriptor for any native segment register is mapped.<br>Used for PM0 (native executed) mode |
| Native segment emulation mode with descriptor mapping (for any PM mode) | Map | ES, DS, FS | CS, SS, GS | Loading segment register operations are executed natively excepting CS, SS, GS. Descriptor for any native segment register is mapped.<br>Used for PM 0-3 (working in SD) mode |

FIG. 6

MEMORY SEGMENT EMULATION MODEL FOR VIRTUAL MACHINE

CROSS-REFERENCE TO RELATED APPLICATIONS

This application is a non-provisional of U.S. Provisional Patent Application No. 60/723,931, filed on Oct. 6, 2005, entitled SEGMENT EMULATION MODEL FOR VIRTUAL MACHINE, which is incorporated by reference herein in its entirety.

BACKGROUND OF THE INVENTION

1. Field of the Invention

The present invention relates generally to Virtual Machine (VM) technology and, more particularly, to methods and systems for emulating the memory segment model of a microprocessor.

2. Background Art

With VM technology, a user can create and run multiple operating environments on a computer at the same time. Each operating environment, or Virtual Machine, requires its own operating system (OS) and can run applications independently. The VM software provides a layer between the hardware of the computing system and the software that runs on it.

Frequently, the problem arises of simultaneously running different operating systems on the same hardware system. For example, with one version of MICROSOFT WINDOWS running on the computing system, it can be necessary to start another instance or another version of WINDOWS or another operating system on the same hardware system.

A typical Virtual Machine Monitor (VMM) enables a single physical machine or processor to act as if it were several physical machines. A VMM, typically jointly with a high-ranking OS (although there are VMMs that can be executed on bare hardware, without a high-ranking OS), can run a number of different operating systems simultaneously, such that each of the different operating systems has its own VM. In other words, a typical VMM can handle a number of VMs, each of which represents its own OS, and each of which can run its own application software and control or use its own hardware, including certain types of processors, I/O and data storage devices, and so on, as if they were running on a single processor. The high-ranking OS is typically referred to as a "host OS" (HOS). The multiple operating systems that are running as VMs are typically referred to as "guest operating systems" ("guest OSs") running "guest code."

A conventional approach for implementing VMs includes a VMM approach developed by IBM and implemented on mainframes, which support virtualization. Another approach includes implementing VMM on modem processors, which do not support the hardware virtualization, such as full step-by-step or page-by-page interpretation of the original code, or full binary translation of the original code, or combining binary translation of some portions of the original code and direct execution of other portions of the original code.

One of the common problems in Virtual Machine technology is the overhead that results from processing of privileged but unsafe instructions, also known as processing of "code under control." In particular, in the context of some Virtual Machine implementations, such as, for example, described in U.S. patent application Ser. No. 11/139,787, entitled METHODS AND SYSTEMS FOR SAFE EXECUTION OF GUEST CODE IN VIRTUAL MACHINE CONTEXT, filed on May 31, 2005, which is incorporated herein by reference in its entirety, the high "cost" of the exceptions needed to handle the privileged but unsafe instructions is of particular concern. In other words, triggering, or raising, the exceptions is one of the major sources of overhead.

Memory management in modern microprocessors is a fairly complex subject. Many modern microprocessors have a large address space, for example, an address space defined by 32 bit addresses (i.e., a $2^{32}$, or four gigabytes, address space), or 64 bit addresses (which corresponds to $2^{64}$ possible addresses). Most practical computers do not have that much physical memory. Typically, only a fraction of the total address space that is theoretically possible is actually physically available in a particular computer. Therefore, complex schemes need to be implemented to ensure that an address specified in the instruction being executed is directed to an address that actually physically exists. To solve this problem, various translation mechanisms exist to convert specified nominal (linear) addresses to actual physical addresses, and to ensure that units of memory (pages, segments, etc.) are swapped in and out of physical memory, as appropriate.

In the context of Virtual Machine technology, the issue arises in ensuring that the emulation correctly takes place, and that the emulation is transparent to the guest code of the Virtual Machine, notwithstanding the need to reconcile the architectural and segment issues of memory addressing. To achieve this, it is desirable to utilize the various useful capabilities of the processor's segment model in the virtualization of the processor.

The second issue that a Virtual Machine designer needs to address is how to utilize the segment architecture of the processor for both the implementation of the Virtual Machine itself, and for various tasks that the Virtual Machine Monitor may need to perform.

In the INTEL architecture, any memory access requires segment translation. To execute an instruction, the CPU uses code segment translation. To access data, CPU uses data segment translation. Any instruction utilizes at least one segment register to address the memory (code segment). For example, in the INTEL processor, CS is the code segment register to execute instructions, SS is the stack segment register to storing data in by default, the stack, DS is the data segment register, and ES, FS, GS are segment registers for other data access. For example, the processor checks the code segment register (CS) prior to execution of any code. Code (instructions) can be grouped by different code segments, and for each segment there is a corresponding descriptor value in the CS register (which defines the start (base) address of the segment, the privilege level, and the limit, or size, of the segment, such that the entire segment in memory is linear and is uninterrupted in terms of its addresses). Similarly, the data segment registers (SS, DS, ES, FS, GS) is usually used to access data in memory. Other items that comprise descriptors include segment granularity, Present—Not Present bit, descriptor privilege level (DPL), type of the descriptor, etc.

Global and Local Descriptor Tables (GDT and LDT) are tables in the physical memory that store segment descriptors for each segment. The value in the segment register is usually referred to as a "selector" and points to the entry in the GDT.

The challenge, therefore, is to ensure that the behavior of the virtualized code matches what it would have been, were it not virtualized, given attempts by the guest code to manipulate the segment registers, and the GDT and LDT. Another issue that arises is how to efficiently virtualize the processor's segment model for the purposes of both the VM and the VMM.

Accordingly, what is needed are methods and systems for efficient emulation of the segment model when running a Virtual Machine.

BRIEF SUMMARY OF THE INVENTION

The present invention is directed to methods and systems for emulation of a memory segment model for a Virtual Machine that substantially obviates one or more of the problems and disadvantages of the related art.

In one aspect, a system, computer program product method of emulating segment addressing by a processor include initiating a Virtual Machine Monitor in a kernel mode; initiating a Virtual Machine in a user mode; forming a dynamically mapped table (or a table with dynamically mapped descriptors) in Virtual Machine Monitor space, the dynamically mapped table corresponding to a table of segment descriptors of the Virtual Machine; populating the dynamically mapped table with descriptors that raise exceptions upon an attempt by the Virtual Machine to address a corresponding segment; and mapping a descriptor to the dynamically mapped table upon the Virtual Machine's use of that descriptor.

In another aspect, there is provided a system for managing memory in a computer running a Virtual Machine, that includes a host operating system having kernel mode privileges; a Virtual Machine having user mode privileges and having a guest table identifying memory segments; and a Virtual Machine Monitor having kernel mode privileges and that maintains a dynamically mapped table of descriptors pointed to segments identified by the guest table, wherein the computer uses the dynamically mapped table to address its memory.

The Virtual Machine Monitor optionally maintains a plurality of dynamically mapped tables of pointers (in the Intel architecture, such structures are called "descriptors," although the invention is not limited to the particular Intel implementation), each table corresponding to a particular privilege level of the processor. Each such dynamically mapped table corresponds to a particular emulation model of segment-based memory addressing. The Virtual Machine Monitor optionally maintains a dynamically mapped table of descriptors for use by the processor when the processor is in one of a real mode and a virtual 8086 mode.

The dynamically mapped table is optionally initialized with descriptors that point to Not Present segments. Entries to the dynamically mapped table are optionally added only when the Virtual Machine attempts to use a corresponding segment.

There are several ways of filling the table entries. One way is when the dynamically mapped table entries are added only when the Virtual Machine attempts to use a corresponding segment. Another way is full table mapping. Yet another way is mixed descriptor mapping, when the VMM can map a descriptor group. The guest tables include a global descriptor table for use by guest operating system code of the Virtual Machine, and a local descriptor table for use by user application code of the Virtual Machine.

The dynamically mapped table includes a first corresponding table with dynamically mapped global descriptors and a second corresponding table with dynamically mapped local descriptors. The Virtual Machine's operations affecting segment registers can be executed in a native mode. The dynamically mapped table is mapped on a page-wise basis. The entries in the dynamically mapped table have the same or lower privilege than corresponding descriptors in the guest table. Therefore, the VMM tracks changes in the guest descriptor tables and synchronizes them by a selected scheme.

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the figures.

DETAILED DESCRIPTION OF THE INVENTION

Reference will now be made in detail to the embodiments of the present invention, examples of which are illustrated in the accompanying drawings.

In the INTEL family of processors, various "privilege levels" are different modes of operation that are characterized, e.g., by different sets of available instructions and accessed registers. Privilege levels may be set through appropriate processor registers.

In the remainder of this description, it is assumed that the reader is familiar with VM concepts generally, with INTEL processor architecture, and particularly with the segment and paging model as it is implemented in the INTEL processors. Furthermore, although particular examples described herein relate to the INTEL architecture, the approach described herein is not limited to the INTEL architecture, and can be implemented with other processor families and processor architectures.

The techniques described herein provide an effective mechanism for implementation of a VM designed for execution of user instructions and particularly instructions of the VM's OS (usually referred to as "guest OS"). Types of instructions that can be singled out in the software code to be executed in the VM include "safe instructions" and "unsafe instructions." Additionally, some kinds of instructions can be singled out in the software codes if the instructions themselves are safe, but the code sequences are unsafe. Safe instructions are instructions that produce the results expected by the guest OS when executed in the VM. Unsafe instructions are instructions that produce results different from those expected by the guest OS when executed in the VM, or that are unsafe from the viewpoint of the VMM or HOS. Additionally, some instructions can be either safe or unsafe instructions, depending on the context of their execution (including the VM context).

As used herein, the term "VM context" refers to circumstances under which a computing system is used. The context settings may include hardware processor registers settings, which define instructions being executed by the hardware processor. Also, context settings may include system libraries being accessed by applications, mapped memory pages, settings of the hardware being emulated in the VM and so on. In one approach, original (i.e., source) guest code can be executed using the software debugger as follows:

Before execution, the VMM analyzes the original guest code. The VMM generates modified (i.e., target) guest code by replacing potentially unsafe instructions with breakpoints (e.g., INT3 or INT N interrupts). During execution of the modified guest code, control is transferred to the VMM at the interrupts. In turn, the VMM, depending on the state of the VM, either restarts the guest code without emulation or emulates the potentially unsafe fragment of guest code in the emulation mode, and then returns control back to the VM.

Note that "original" guest code (or "source" guest code) generally refer to unanalyzed guest code, while "modified" guest code and "target" guest code generally refer to analyzed and modified guest code which has been processed (e.g., by insertion of breakpoints in the original guest code) for direct execution. In one embodiment breakpoints can be placed directly into original code. Alternatively, breakpoints can be placed into a copy of the portion of the original code. In that case, the same absolute effective (EIP) addresses of the instructions of the target code should be maintained. One possible technique is changing guest code segment (CS) descriptor base address in GDT (global descriptor table).

In one approach to Virtual Machines, a software debugger can be used to set up breakpoints, or interrupts, forcing the processor to raise exceptions (e.g., to prevent illegal access to memory or to input/output devices). Optionally, instructions that cause the processor to raise exceptions can be used as breakpoints.

The problem for any Virtual Machine is that the exceptions that result in a switch of the context from the VM to the VMM can occur anytime. For example, one instruction changes the values in the GDT, and a subsequent instruction in the guest code loads one of the segment registers. In-between those instructions an exception can occur, which results in storing of the context of the VM, loading of the context of the VMM, and therefore resetting the cached descriptors to new values. Upon return to the VM context, the "wrong" values will be stored in the cached descriptors (sometimes called "descriptor caches" or "shadow descriptors"), and the VM will no longer work correctly. The problem, with INTEL processors is that there is no way to directly manipulate cached descriptors.

It should be noted that the issues described herein apply equivalently to the Local Descriptor Table (LDT) and to the Global Descriptor Table (GDT). Typically, each user process uses its own Local Descriptor Table, while the Global Descriptor Table is intended for all processes of the OS kernel code. It should be remembered that the guest OS maintains a guest area for the GDT, thinking that it is the "real" operating system, while in reality, the host operating system maintains "the real" Global Descriptor Table.

Figure 1A:
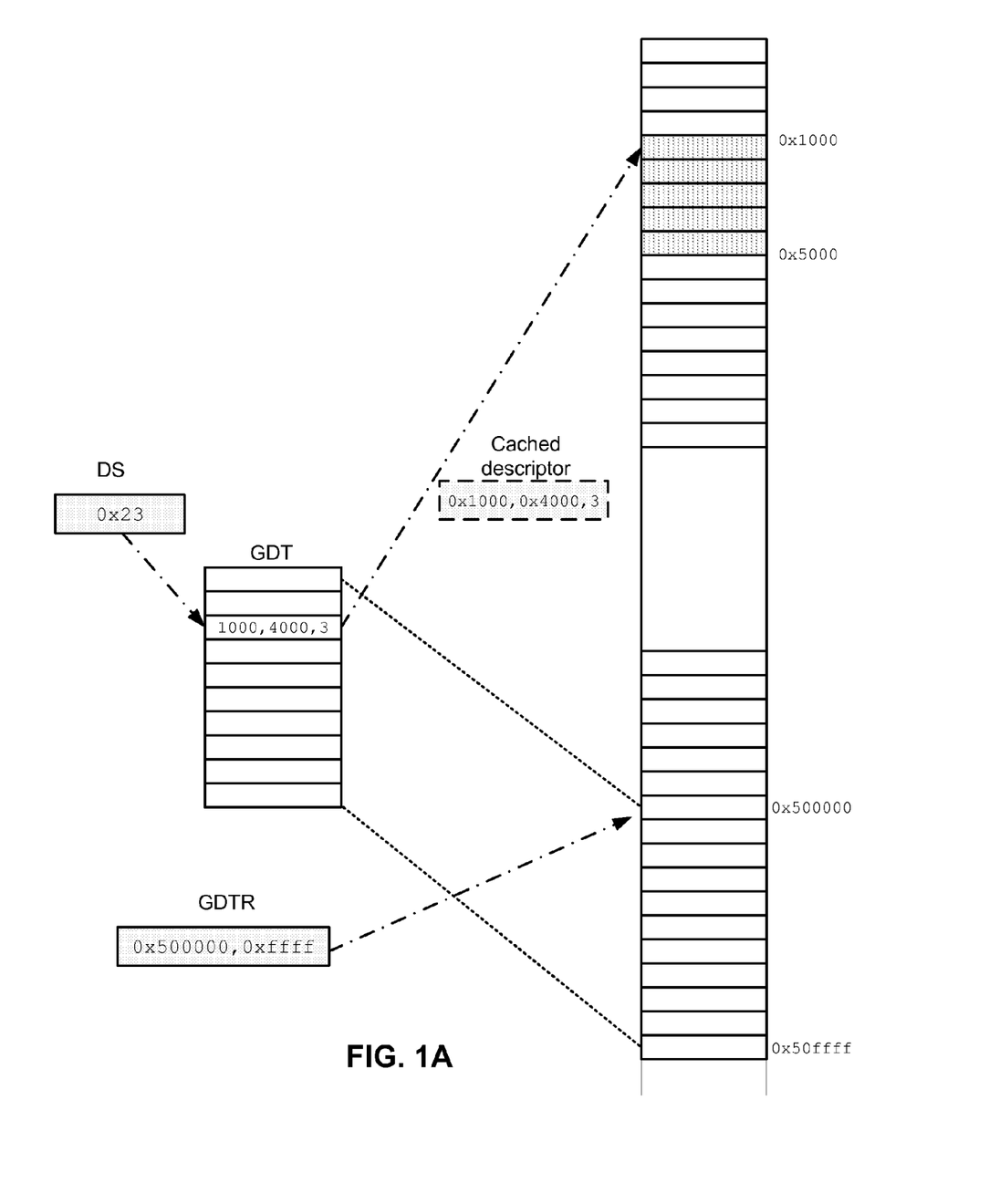
FIG. 1A illustrates an example of what segment is and how INTEL architecture describes segments.

The following somewhat simplified example (see also FIG. 1A) is intended to illustrate one of the problems in the INTEL architecture that arises when attempting to fully virtualize INTEL's segment model. Consider a sequence of instructions as follows:

<move descriptor> [0x500000+0x20], <descriptor [0x1000, 0x4000, 3]>

MOV DS, 0x23

. . .

<move descriptor> [0x50000+0x20], <descriptor [0x2000, 0x4000, 3]>

. . .

. . .

. . .

MOV DS, 0x23

For example, consider the situation where the GDT is located at address 0x500000 and has a limit 0xffff. In other words, the register GDTR contains values 0x500000 and 0xffff, which is a pointer to the beginning of the Global Descriptor Table (0x500000) and the length (0xffff, last valid byte offset). Initially, the value [0x1000, 0x4000, 3] is loaded at memory location 0x500020. This means that the segment to which this descriptor applies starts at address 0x1000, has a size of 0x4000, and has a privilege level ring 3. The value 0x23 is then loaded into the data segment register DS, which means that the DS register is now a pointer (selector) that points to the entry in the Global Descriptor Table located at address 500000+(0x23 without the tail three bits)=0x500020. Thus, once the instruction MOV DS, 0x23 is executed, the value [0x1000, 0x4000, 3] is loaded into the descriptor cache.

As such, the descriptor in the Global Descriptor Table may be viewed as a pointer record, which includes a pointer to the starting address of the segment, a derivative pointer to the end address (based on the size of the segment), granularity, and a privilege entry specifying which operations can be performed on this segment (in other words, the shadow descriptor is loaded when the DS register is loaded, after the MOV DS, 0x23 instruction, points to the segment starting at 0x1000, ending at 0x5000, and having a privilege level ring 3). It should be noted that the INTEL architecture has a separate complex mechanism for handling privilege issues, which can include read privileges, write privileges, presence, etc. The processor also makes sure that improper attempts to address memory addresses outside the specified segment are not permitted. Next, in the above example, the value [0x2000, 0x4000, 3] is loaded into the GDT by the following operation:

<move descriptor> [0x500020], [0x2000, 0x4000, 3]

This means that the segment at issue now starts at 0x2000, ends at 0x6000, and has a privilege level ring 3. However, the shadow descriptor is not updated, and remains the same as before—[0x1000, 0x4000, 3]. This means that the code between the operation <move descriptor> [0x500020], [0x2000, 0x4000, 3] and the instruction MOV DS, 0x23 will continue executing with an "incorrect" value in the shadow descriptor. The shadow descriptor will only be updated when the second instruction MOV DS, 0x23 is executed. That instruction reloads the same value 0x23 into the data segment registered DS, but only from that point forward will the "correct" value [0x1000, 0x4000, 1] be loaded into the shadow descriptor cache, and will be used for subsequent processing.

This means that some of the instructions will be executed by the processor with the shadow descriptor pointing to the "wrong" place. However, whether the value in the shadow descriptor cache is regarded as "correct" or "incorrect" in some abstract sense, it is what is expected by the guest code. Therefore, even though few programmers would deliberately write code to take advantage of this peculiarity, a full virtualization of the processor requires that the Virtual Machine act in the same manner as the "real" machine.

Next, consider what happens if the guest code raises an exception, and therefore, the Virtual Machine Monitor is called, in the sequence of instructions shown below:

<move descriptor> 0x500020, [0x1000, 0x4000, 1]
MOV DS, 0x23
. . .
<move descriptor> [0x500020], [0x2000, 0x4000, 3]
. . .
INT3
. . .
. . .
MOV DS, 0x23

Upon encountering the interrupt INT3, the exception is raised, and the Virtual Machine Monitor is invoked. That means that the context of the Virtual Machine is saved somewhere (in this case containing the value 0x23 for the DS register, and the value 0x500000 for the GDTR register). The Virtual Machine Monitor context is then loaded, which includes completely new values in the segment registers (including the DS register), completely new values for the descriptors in the Global Descriptor Table (or equivalently, a new value in the GDTR, which points to an entirely different address containing the VMM's Global Descriptor Table, etc.). The cached shadow descriptors are therefore replaced with different values.

The INT3 instruction is then emulated (or the exception is somehow processed, which may require emulation), and the context is restored back to the VM's context. That means that the values of the segment registers prior to the exception are also loaded back into the segment registers (in this case the value 0x23 is loaded into the DS register once the emulation is completed).

This, therefore, means that after the execution of the INT3 interrupt, the value of the cached shadow descriptor is [0x2000, 0x4000, 3]. This is logically, in some sense, the "correct" value, but it is not with the guest code would have done, were it running as the "real" machine. The actual (non-virtualized) code would have continued executing with the shadow descriptor [0x1000, 0x4000, 3] rather than the shadow descriptor [0x2000, 0x4000, 3].

The guest operating system has its own GDT, which it maintains in memory. The register GDTR points to the address of the guest operating system's GDT. One simple way to handle the guest operating system's attempts to modify its GDT is to emulate every instruction that attempts to modify the segment registers or the GDT itself. For example, instructions that load the data segment register DS, such as MOV DS,AX, are replaced by an interrupt, for instance, INT3. Upon encountering the interrupt INT3, an exception is raised, and the VMM then emulates the behavior of that instruction. Thus, for example, the guest operating system loads (or tries to load) the selector value 8 into the data segment register DS (so that the DS register now uses the descriptor from location 0x500008 in memory, or the 8th position in the GDT). This attempt is intercepted, and the VMM loads a different value that it needs (for example, 50) into the DS register. Thus, the emulation ensures that when the guest operating system attempts to manipulate the value in the segment register, the VMM, through emulation, ensures that "correct" descriptor values are used. However, emulating the guest operating systems handling of the segment registers is relatively overhead-intensive. Therefore, it is desirable to be able to handle such instructions in the native mode, rather than switching the context to the VMM every time such instructions are encountered.

In the INTEL architecture, the segment model, segment registers, and the handling of the segments by the processor are intimately tied to the protection scheme of the processor, and therefore needs to be properly emulated by the Virtual Machine. For example, many instructions are handled differently, depending on which mode of the processor is currently in effect, for example, real mode (RM), protected mode (PM), virtual 8086 mode (V8086), as well as the various protection levels (ring levels) in the protected mode. Depending on the mode and the privilege level, the same instruction can produce different results. Also, some instructions that are permitted in some of the modes are not permitted in others. Further still, the guest code can itself switch between the various modes during execution, particularly since the guest code itself is unaware that it is "guest code." For example, the guest operating system can have a user application running within it. The user application code runs in ring 3 privilege level, while the guest OS code thinks that it runs in ring 0, ring 1, or ring 2. However, in reality, all the guest code, whether it is OS code or user application code, runs in ring 3. This is transparent to the Virtual Machine. Therefore, in addition to emulation of attempted protection violations, the emulation needs to take into account such events as changing of the protection level, changing of the processing mode, etc.

Figure 1B:
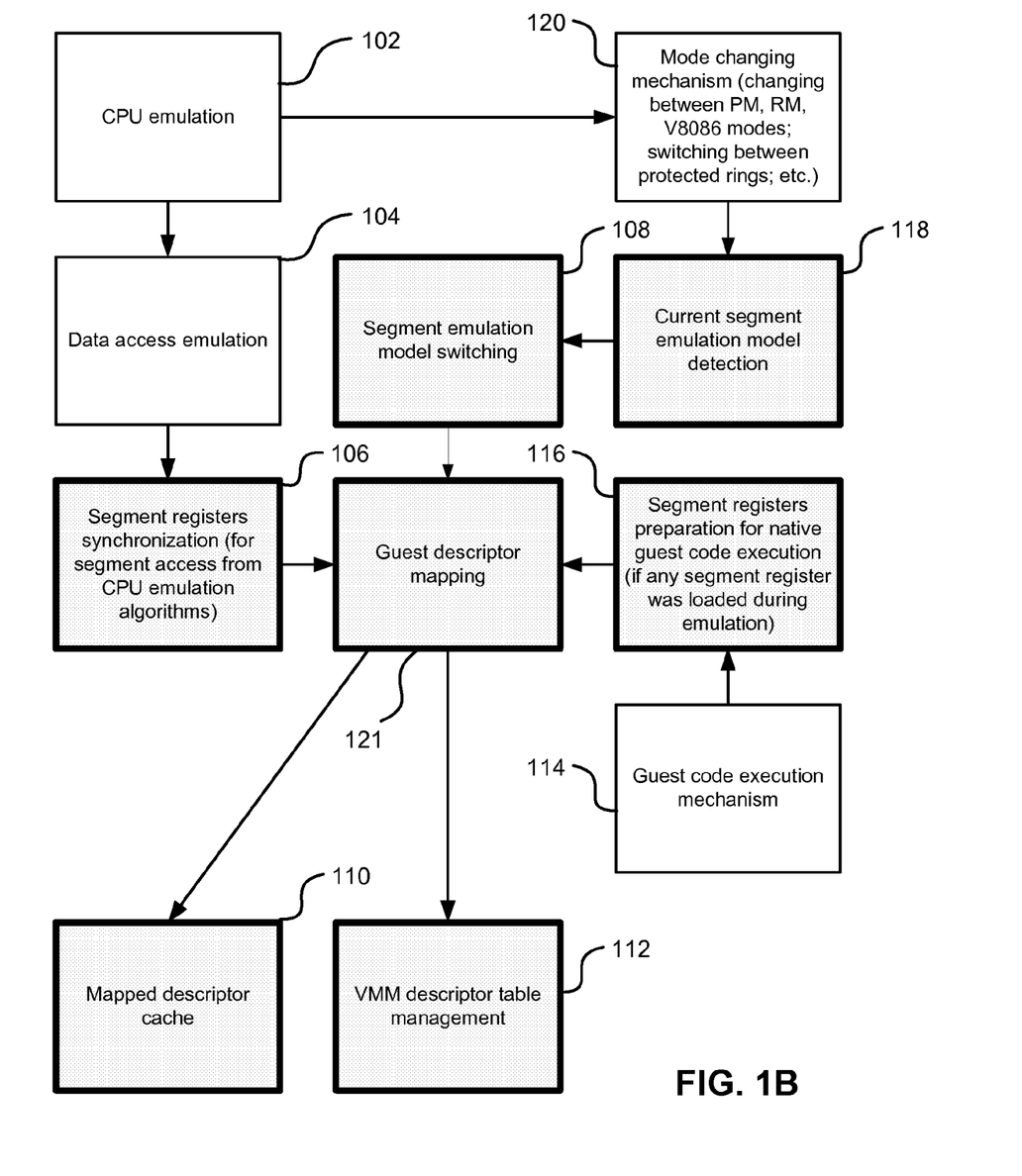
FIG. 1B illustrates in block diagram form the various processes and events that impact the segment model emulation.

FIG. 1B illustrates in block diagram form the various processes and events that impact on the segment model emulation. Generally, emulation of the CPU behavior (102) needs to emulate two aspects: emulation of the data access 104 (which relates to properly handling memory access based on the segment registers and the current protection level, or "CPL"), and the changing of the processor virtualization mode 120. To enable proper memory access, segment register emulation structures need to be synchronized, in order for the CPU to correctly emulate access to the memory (see 106).

This therefore becomes an input to the guest descriptor mapping process 121. The changing of the processor mode 120 requires that the Virtual Machine Monitor detect this event (see 118). In if such an event takes place, the segment emulation mode may need to be changed (see 108). In practice, this means that depending on the processor mode, the Virtual Machine Monitor potentially has different templates for emulating different instructions, since their behavior may be different, depending on the processor mode. This, then, is reflected in the guest descriptor mapping process 121.

Furthermore, guest code is preferably executed primarily in the native mode (see 114). It is obviously desirable to execute as much of the guest code as possible in the native mode. However, as discussed above, the INTEL architecture has a problem in how cached descriptors are handled. Therefore, this needs to be taken into account as well (see 116). Therefore, the possibility of the cached descriptor not reflecting the proper value upon return to the guest code is another interest to the guest descriptor mapping process 121. The primary mechanisms by which the Virtual Machine Monitor handles segment model emulation are mapped descriptor cache 110, and the mechanism by which the VMM manages the GDT and the LDT (110).

Figure 2:
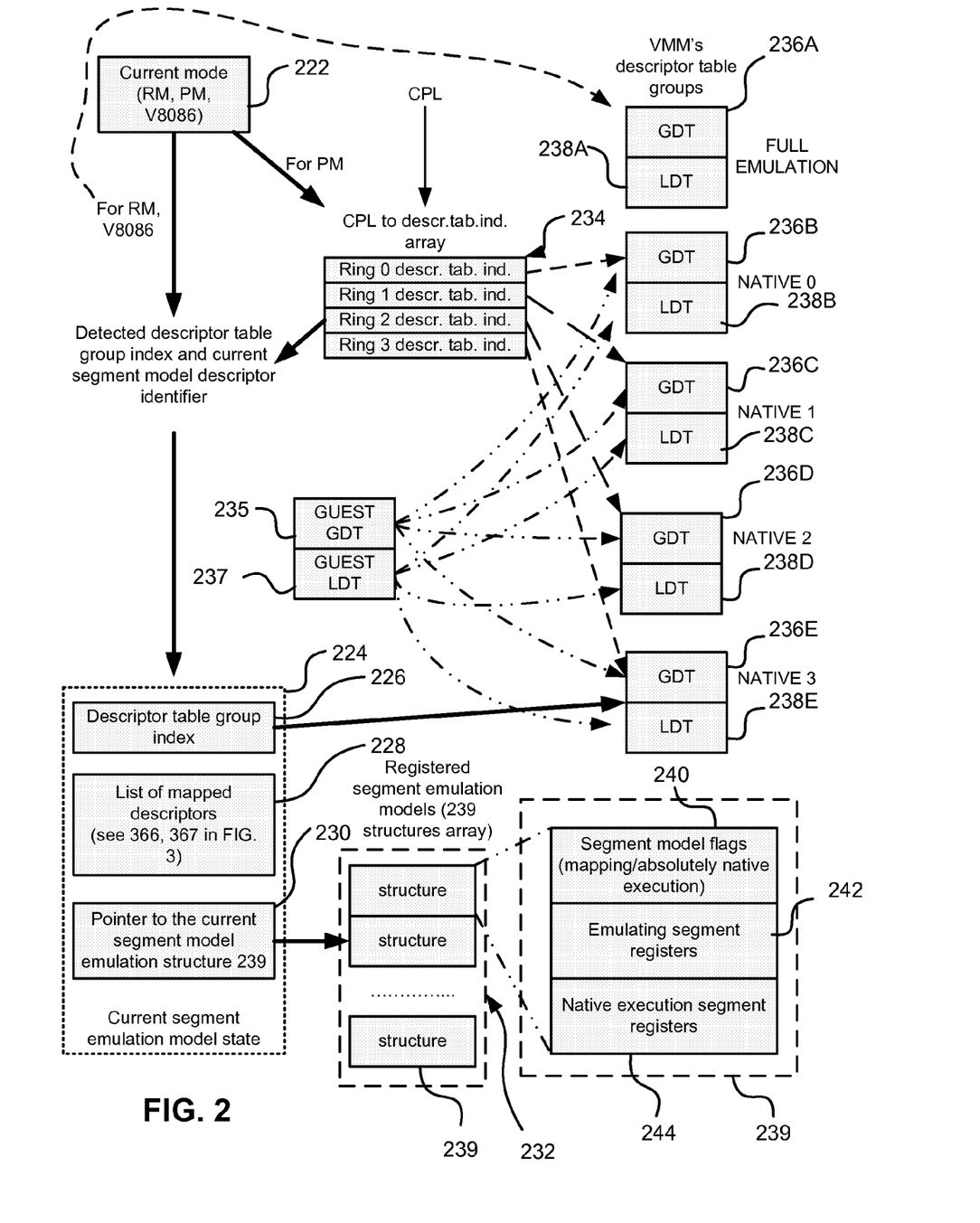
FIG. 2 illustrates how global descriptor tables (GDTs) and local descriptor tables (DTs) maintained by the Virtual Machine Monitor fit into the segment model emulation.

FIG. 2 illustrates how global descriptor tables and local descriptor tables maintained by the Virtual Machine Monitor fit into the segment model emulation. As shown in FIG. 2, the current mode that the processor in may be either the real mode, the protected mode, or the virtual 8086 mode (see 222). If the processor is in the protective mode, that means that it is running in one of the four privilege levels ring 0 through ring 3. This is generally referred to as a CPL, or current protection level. Therefore, the Virtual Machine Monitor has four sets of tables, designated by 236B-236E and 238B-238E, which represent translated, or mapped, values of the Virtual Machines' (or guest's) GDT and LDT. In other words the descriptors in the guest GDT 235 are mapped to four GDT tables—236B-236E. The descriptors in the guest LDT 237 are mapped to four LDTs 238B-238E. The structure 234 is a set of pointers that contains the addresses of the corresponding tables (GDT and LDT), depending on the privilege level. Thus, the four tables 236B-236E and 238B-238E are directed to executing the guest code in the native mode, corresponding to one of the privilege levels (ring 0-ring 3), which is selected based on one of the pointers in the structure 234. In the event that the guest code is being fully emulated or segment virtualization model does not need the descriptor tables (such as the V8086 mode), the set of GDT/LDT 236A and 238A is used. This occurs when the processor is in either the real mode (RM) or in the virtual 8086 (V8086) mode. If the processor is in either the real mode or the V8086 mode, the current segment emulation model needs to be specified, see 224.

The current segment emulation model needs to identify which of the sets of VMM tables (GDT/LDT) is used (in other words, whether it is group B, C, D or E). The current segment emulation model state needs to also identify which descriptors have been mapped to the VMMs GDT and LDT (element 228), see discussion below with regard to 366 and 367 in FIG. 3. Finally, the current segment emulation model needs to identify the properties of the model as they relate to the handling of the registers and model flags (see 230). The set of pointers 232 identify an appropriate set of segment registers and flag and how they are being used, see elements 232 and 239.

Generally, the segment emulation model needs to identify which segment registers are being emulated (in other words, operations involving those registers are emulated), which are being used in the native mode, in other words, without emulation (see 242); which flags used and how (see 240); and which segment registers are used for native code execution (see 242). For example, one particular segment emulation model can treat all operations involving the registers GS and ES as being handled in the native mode, and the registers and DS and CS (and some of the flags) as requiring emulation. Collectively, the elements identified in 239 comprise the segment emulation model. Switching between segment emulation models means switching between one set of elements that comprise 239, and a different set of elements (for example, a model that emulates changes that involve only the handling of the DS register, while the others are handled in a native mode). Collectively, the items in 239 are used by blocks 106, 108 and 116 in FIG. 1B.

One of the aspects that needs to be addressed is a phenomenon sometimes referred to as "ring compression". In the INTEL architecture, there are four privilege levels, with level (ring) 3 normally being used for user application code, and ring 0 normally used for operating system code. Some operating systems utilize all four levels available in the INTEL architecture, while other utilize only ring 0 and ring 3. For example, WINDOWS only uses ring 3 for user application code, and ring 0 for OS code. OS/2, on the other hand, utilizes all four ring levels. However, in the Virtual Machine as discussed herein, all the levels are compressed into a single level—ring 3. That means that the guest code can "think" that it is running in any of the privilege levels, however, in reality it is always running on ring 3 level. This, however, needs to be transparent to the Virtual Machine.

Thus, part of the segment emulation model needs to take into account operations with the segment registers that the guest code may attempt to perform. One possibility for handling this issue may be referred to as a "brute force" approach, where any operation involving the segment registers, the GDT, and the LDT automatically raises an exception, and the Virtual Machine Monitor then emulates those instructions. However, as noted earlier this is extremely overhead intensive, since operating system code frequently contains operations involving at least segment registers. Therefore, it is desirable to have as much of the code as possible to run in the native mode, even if it contains operations involving the segment registers. Similarly, the brute force approach to handling the GDT and the LDT would use the page protection scheme. For example, knowing where the guest OS maintains its GDT and LDT, it is possible to protect those pages from an overwrite, and any attempt to modify the LDT or the GDT by the guest OS (either using the load GDT (LGDT) or load LDT (LLDT) instructions, or using conventional memory operations to load the value into memory), can trigger a page fault, throwing control to the VMM. This, however, is overhead intensive, as noted above, and is preferably avoided.

Figure 3:
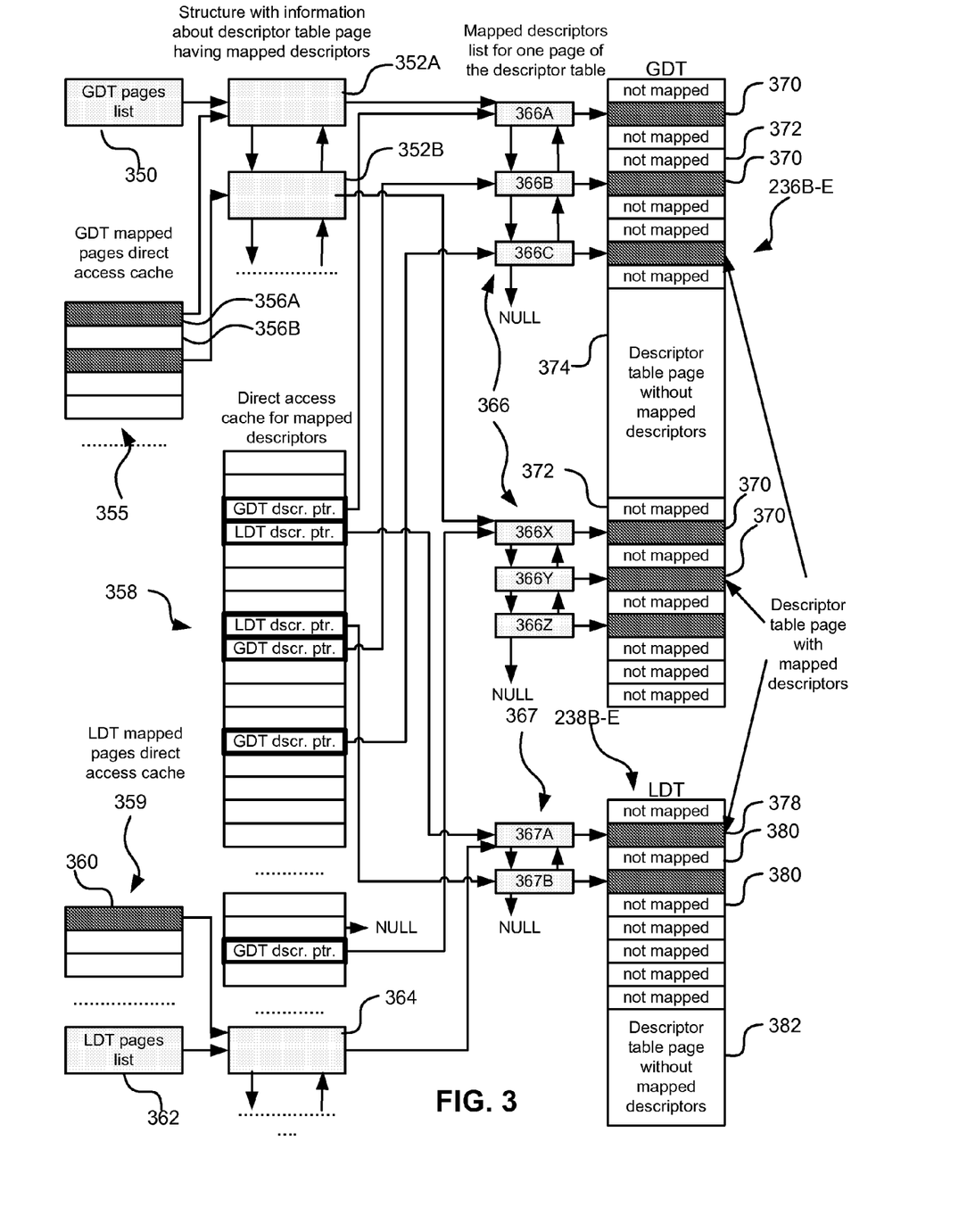
FIG. 3 illustrates one embodiment of how the Virtual Machine Monitor uses its GDT and LDT to emulate the segment model of the INTEL processor and how it manages structures involved to the mapping.

FIG. 3 illustrates how the Virtual Machine Monitor uses its GDT and LDT to emulate the segment model of the INTEL processor. For purposes of explanation, the figure will be described primarily going from right to left. On the right of FIG. 3 is one of the GDTs 236B, 236C, 236D or 236E that are illustrated in FIG. 2. Also on the right is one of the LDTs 238B-238E. The selection of which of the four sets of tables is actually used by the VMM depends on the emulation model (see a possible list of models in FIG. 6), which in turn depends on which privilege level the guest code thinks it is using. It should again be remembered that the tables shown in FIG. 3 (GDT and LDT) are the tables that the real physical processor actually uses to work with. The guest code (OS and user applications) maintain their own guest GDT 235 and guest LDT 237, but the processor, in fact, never uses them. Since it is the VMM's GDT 236 and LDT 238 that is used by the physical processor, the descriptors in the guest GDT 235 and the descriptors in the guest LDT 237 needs to be mapped, or translated, into the VMM's GDT 236 and VMM's LDT 238.

Initially, the GDT 236 and LDT 238 in FIG. 3 are populated with descriptors that point to "Not Present" segments, such that attempting to access them will trigger a presence fault. This means that if a descriptor has not been mapped to the GDT 236 or the LDT 238, attempting to use that descriptor will trigger a fault, which in turn invokes a context switch to the Virtual Machine Monitor, which in turn means that the Virtual Machine Monitor needs to translate, or map, the descriptor into its GDT 236 or LDT 238. It should be also be noted that the mechanism that uses and maps the descriptors in both the GDT and the LDT is essentially identical, the only difference is that the GDT is normally used by the operating system, while the LDT is normally used by the user application code. Other than that, there function is the same.

370 designates a page in the GDT 236 that has mapped descriptors in it, and can be used to address the memory and the segment designated by that descriptor. 372 designates a page in the GDT 236 that contains descriptors that have not been mapped. Attempting to use a descriptor in that page will trigger a fault. 374 designates an area in the GDT where the descriptors from the guest GDT 235 can be used "as is," without any need for translation and mapping. In other words, the descriptors in the area 374 correspond to code which are a priori known to be absolutely safe.

Similarly, for the LDT 238, 378, designates a page in the LDT 238 that has mapped descriptors. 380 designates a page in the LDT 238 that where the descriptors have not been mapped. 382 designates an area in the LDT 238 where the descriptors can be used "as is" (in other words, without any modification, similar to the scheme for the GDT 236).

This therefore takes advantage of the fact that, as a practical matter, only a handful of the descriptors are actually used at any given time. The GDT and the LDT can actually contain hundreds or even thousands of descriptors, however, for the vast majority of the applications, only two or three such descriptors are actually used. For example, it is quite common to use one descriptor that designates a four megabyte segment for operating system code and data, and another descriptor that designates a four megabyte segment for application code and data. Depending on the application, and the size of the data, one or two additional descriptors might also be used. The point is, although the processor theoretically has an ability to use a very large number of such descriptors, only a handful are in reality used. This is actually an illustration of one of the practical realities of the INTEL architecture—the processor, particularly the Pentium family, and its derivatives have many capabilities and instructions that are seldom, if ever utilized, as well as many redundant capabilities. For example, much of the same purpose regarding the protection mechanisms can be accomplished using both the segment model and the paging model of the processor.

Historically, in the mid-1990s, many of the more popular operating systems (such as OS/2, WINDOWS 95, WINDOWS 98, etc.) relied on the segment model of the INTEL processor, and such operating systems frequently had code that relied on a considerable amount of manipulation of the segments, descriptors, and segment registers. The trend in recent years has been away from using INTEL's segment model, and more towards relying on the paging model for protection. This, therefore, means that, as noted above, only a handful of the descriptors are actually used. The process described in this application, which may be called dynamic descriptor mapping, relies on this, and avoids emulating instructions that manipulate or affect the segment registers by raising exceptions only when a new descriptor is actually used.

Figure 5:
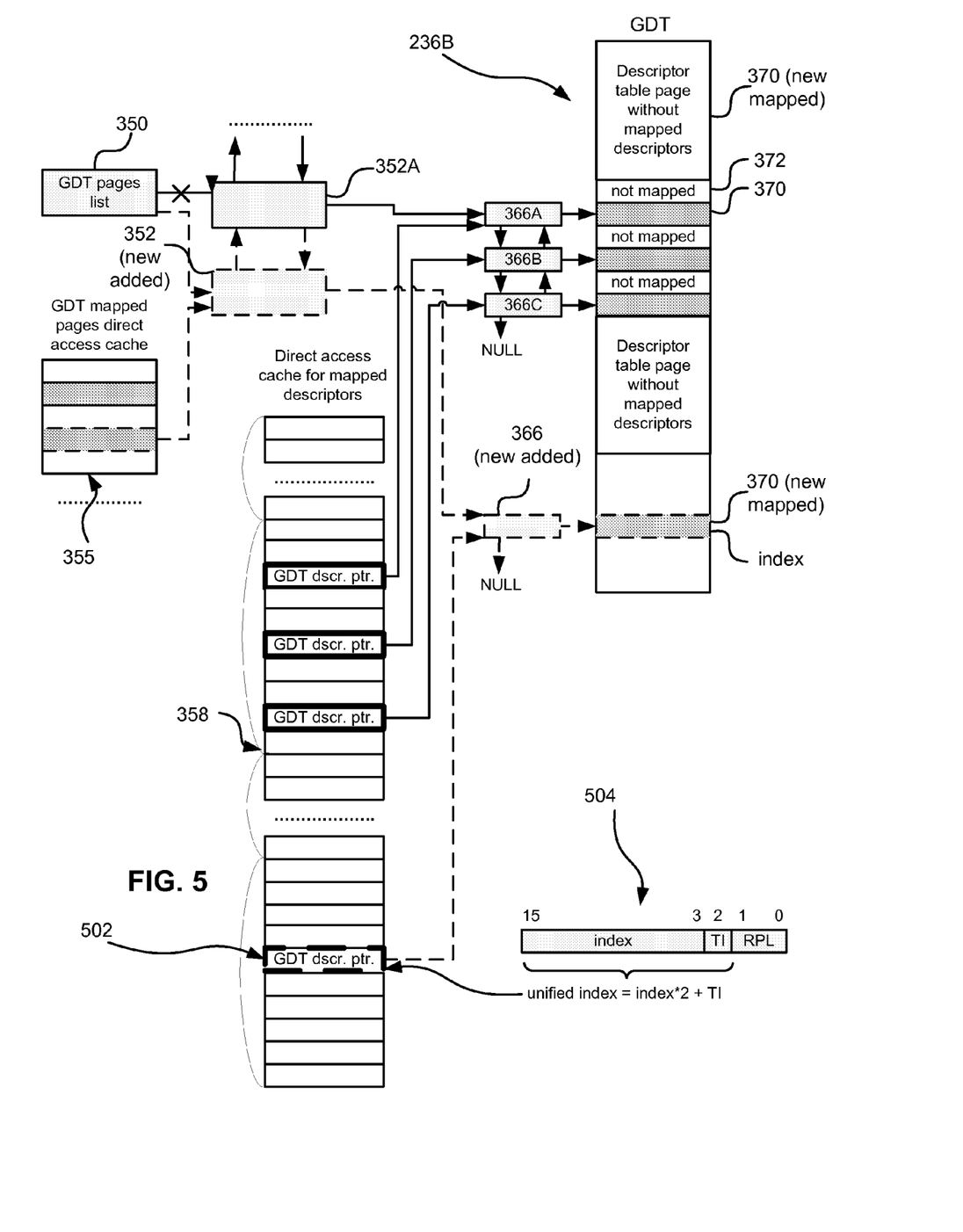
FIG. 5 further illustrates the process of forming pointers to the VMM's GDT and LDT (which is related to access optimization to mapped descriptors from tables).

Returning to FIG. 3, and moving from right to left, 366 designates a set of pointers (366A-366Z) that point to mapped descriptors from the page in the GDT 236. FIG. 5 further illustrates the process of forming the pointers 366. Similarly, 367 designates a set of pointers (367A-367B . . . ) that point to mapped descriptors from the page in the LDT 238. Continuing to move from right to left, the pointers 366A-366Z are formed based on a list of pages in the GDT 350, into a direct access cache 355. The structure 355 is a set of pointers that organizes fast access to pointers 352. Similarly, 359 is a set of pointers that organizes fast access to pointers 367. Together, the list of GDT pages 350 and the structure 355 is used to generate the structure 352. The structure 358 is a direct access cache for mapped descriptors that can be used to get a direct pointer to the mapped descriptor without passing any additional pointers.

A descriptor selector shown as structure 358 allows by using a single operation to get a descriptor. This is a very useful optimization for time-limited algorithms. The entries in the structure 358 alternate between pointers to 366 (GDT mapped descriptors) and pointer to 367 (LDT mapped descriptors), since in the descriptor format, one of the bits designates whether this descriptor is a GDT or an LDT descriptor, 0 being GDT, and 1 being LDT. This, therefore, provides a method for optimizing access to the VMM's GDT. In the case of 32-bit architecture, the pointer is 4 byte data, the descriptor from the descriptor table is an 8 byte descriptor, therefore a convenient selector to the cache 358 index translation can be generated by simply ignoring the lowest selector bits (even index beginning from 0 points to GDT descriptor, odd one points to LDT descriptor). This fast access approach can be readily modified by using a shift operation to access data in other architectures, where descriptor selector uses the same or similar approach.

It should also be noted that the structures illustrated to the left of the GDT 236 and the LDT 238 in FIG. 3 relate to one particular implementation. Other mechanisms may be used to accomplish the same thing, and the invention is not limited to the particular approach illustrated in these figures.

356A in the structure 355 designates an entry for which there is a corresponding mapped descriptor. 356B, essentially a null value, ultimately points to or is related to the area 374. A similar approach is taken with the structure 359.

Consider again the situation where the guest OS attempts to load the value 8 into the DS register in FIG. 1A. Since the corresponding descriptor is not present in the VMM's GDT, an exception is raised. The value 8 is copied to the VMM's portion of the GDT, and the descriptor will have the corresponding privilege level changed to ring 3.

Figure 4:
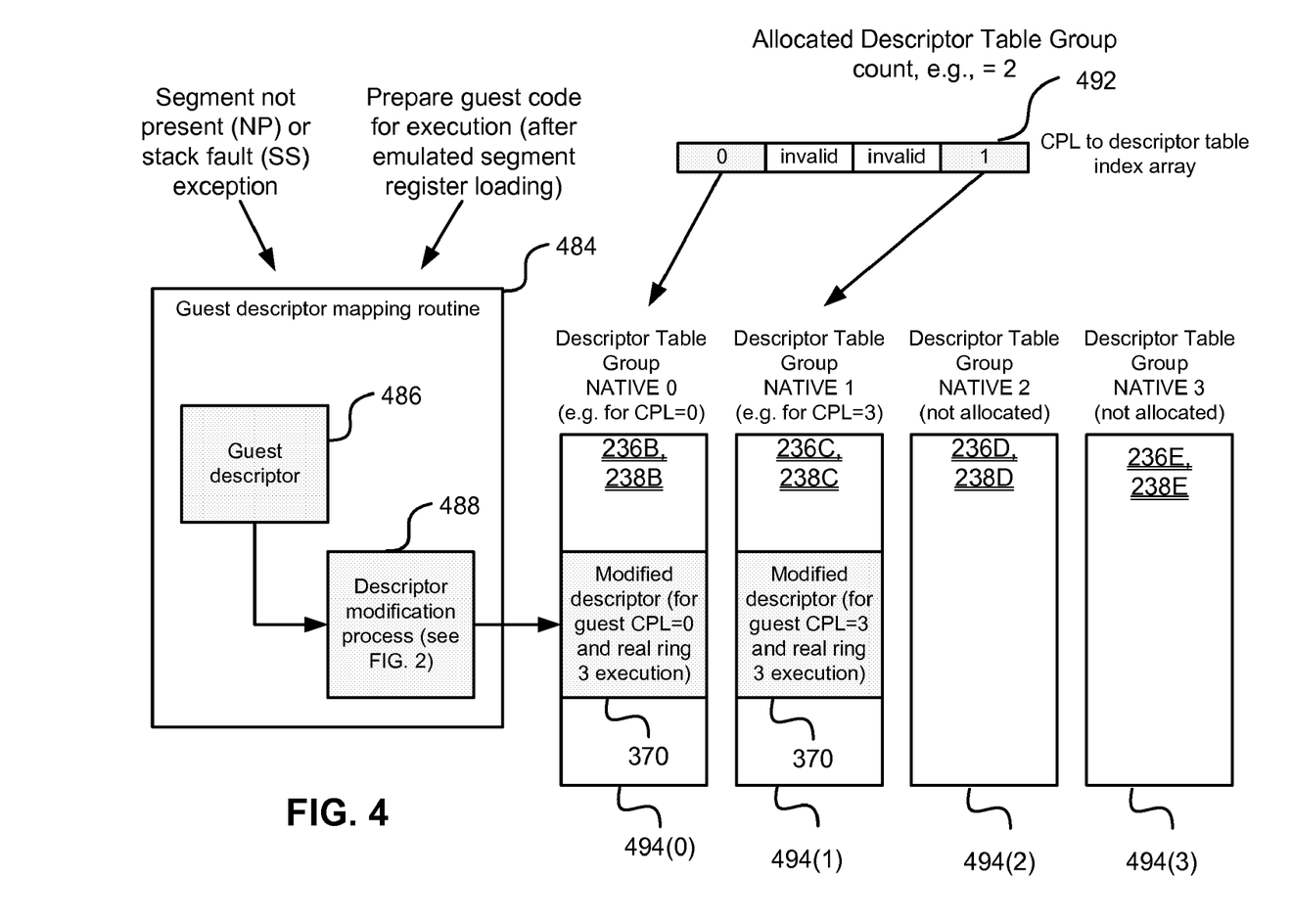
FIG. 4 illustrates an example of how guest descriptors are mapped to descriptors in the VMM's GDTs and LDTs.

FIG. 4 illustrates an example of how guest descriptors are mapped to descriptors in the VMM's GDTs and LDTs. A guest descriptor mapping routine 484 is invoked whenever the "segment not present" exception is raised, or the "stack fault" exception is raised. The guest code is prepared for execution after the emulated segment register has been loaded. The guest descriptor 486 is then run through a descriptor modification process, generally conforming to what is shown in FIGS. 2 and 5. For example, the descriptor privilege level (DPL) frequently needs to be changed to become higher numerically (in other words, in the direction of lower privilege). Since all the guest code runs in ring 3 privilege level, DPL3 will map to DPL3. DPL0, 1 and 2 will also map to DPL3, etc. Mapping all descriptors to DPL3 is one possible embodiment of the descriptor mapping scheme. This (or a different) scheme can also be used for other privileged ring translation algorithms (including guest 0 to 1, and other privileged rings are mapped without changes DPL). Once the descriptors for each of the tables 236 and 238 are formed, they are then placed in the appropriate tables. Note that in the example illustrated in FIG. 4, only two privilege levels are used by the guest code, ring 3 and ring 0. That means that only two sets of tables needs to be maintained, which is indicated in the structure 492. As noted above, the actual number of sets of tables can vary between one and four for the INTEL processor, with one for each privileged level used by the guest OS.

It should also be noted that the use of multiple sets of tables is an optimization issue. It is also possible to use a single large table in the VMM for the GDT, and a single large table for the LDT, keeping track of which descriptors are actually used and have been dynamically mapped. However, the use of multiple sets of tables is conceptually cleaner and permits easy switching between the various emulation models (see FIG. 6) when the guest code attempts to change its privilege level.

Exception handling may be based on using a paging model of address processing by the processor, and can be implemented as follows:

1. A page of the original guest code is analyzed;
2. A copy of the page of the original guest code is created and certain unsafe instructions are replaced with breakpoints to generate a modified (analyzed) page of guest code;
3. The modified (analyzed) page of guest code is executed; and
4. During execution of the modified (analyzed) page, control is transferred to the VMM if exceptions are raised at the breakpoints, and the VMM, by analyzing the VM context, either (i) generates bypassing code, which does not contain unsafe instructions, or (ii) provides execution of the unmodified original guest code, or (iii) provides for execution of different code, which ensures that the execution of the potentially unsafe instructions becomes safe, for example, by adjusting the VMM context.

The approach described above can also be used not just with modified pages of the guest code. Sometimes, guest code can be detected as safe for execution, and it is executed as is, without modification. The descriptor mapping scheme can also be used here.

Sometimes it can be assumed that the LDT is used for guest OS user application only (dependent on the guest OS). In this case, the guest LDT can be used without any changes (and the VMM can load the guest LDT directly to the real processor).

There is a difficult issue for virtualization related to the segment register shadow descriptor (for those processors where such a scheme is present). For example, the INTEL processor loads the value of the cached descriptor corresponding to segment register during segment register loading operation only. Therefore, the pointer table (GDT or LDT) entry modification must never influence on the cached value. The VMM should take this into account during guest code native execution interrupts due to any reason (exception or interrupt handling, etc.). The VMM handles the interrupting event, and in most cases reloads several segment register values. The old shadow descriptor remains loaded in the VMM's descriptor table. An unsynchronized shadow descriptor in the guest table is a problem for guest code native execution.

As a simple example, the guest code loads the value of segment register DS to one value, and the shadow descriptor is renewed. Then, the guest code modifies the descriptor value in the descriptor table corresponding to selector loaded into the DS. From this point, the shadow descriptor becomes unsynchronized with descriptor table entry, but all the subsequent instructions using DS continue to access data though the unsynchronized shadow descriptor until next DS loading operation occurs. The VMM has to use its own pointer table set to virtualize segments, and in the case when execution fails somehow due to the existence of the unsynchronized shadow descriptor, the VMM should handle repair of such state when it resumes guest code execution. The VMM should take into account two aspects: the guest code resumes with a valid DS selector and a valid corresponding shadow descriptor; and supports handling of shadow descriptor renewal during next segment register loading operation (e.g., an exception during a load of the selector will be triggered, and the native exception will be interrupted). The second aspect concerns loading the same value into the segment registers (other selectors correspond to actual descriptors as described above).

One of the aspects of the approach described herein is handling such situations. The VMM maintains shadow descriptor values in their pointer table set for unsynchronized segment registers and actual (translated) guest descriptors in other cases. The VMM stores the actual values of translated descriptors in their descriptor table set (used for access data), which sometimes do not correspond to descriptors in the VM tables. This addresses the first problem.

The remaining problem is to renew shadow descriptor during next segment register loading. This is done by loading the shadow descriptor of the real processor before restarting the guest code, and resetting descriptor Present bit (descriptor in table becomes not-present, but the shadow descriptor is already loaded). This allows "catching" shadow descriptor renewal when guest code loads the same selector to the segment register (by using the Not Present exception). The exception leads to guest shadow descriptor renewal in the descriptor table virtualized VM segments (by a general pointer mapping scheme).

Another enhancement is temporarily placing the actual VM shadow descriptor to the descriptor table before restarting the guest code. Then the VMM refreshes real processor shadow descriptor by loading the segment register value. Segment register has the actual selector and valid guest shadow descriptor. Then the VMM saves to the corresponding descriptor table entry the actual translated value from the guest table. When the segment register is loaded, the same selector shadow exception doesn't occur, but the VM shadow descriptor will be refreshed correctly.

The unsynchronized descriptor handling scheme can be formulated as placing VM shadow descriptor into corresponding segment register selector, loading processor segment register by the selector (segment register and its shadow descriptor have the correct VM values now), and modifying corresponding virtualization descriptor table descriptor entry with another descriptor, which allows correct handling of the next segment register loading operation.

Figure 6:
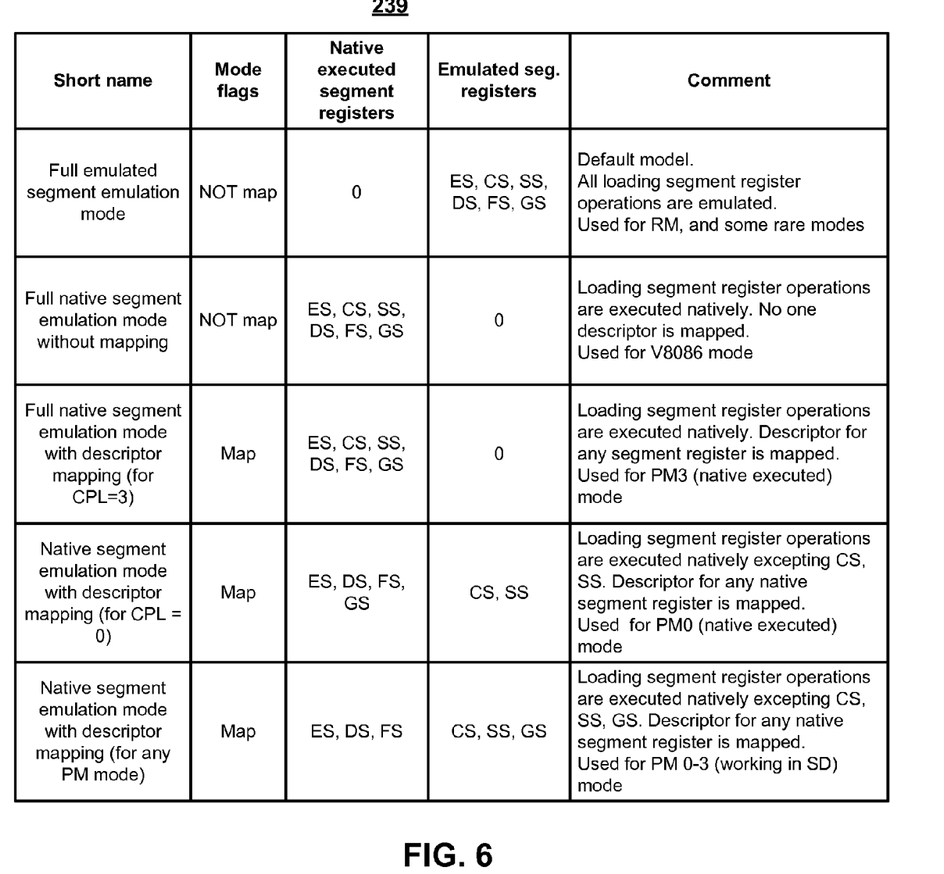
FIG. 6 illustrates various exemplary segment emulation models.

The above discussion of unsynchronized descriptors applies to every native VM segment register (the set of such registers is virtualization model-dependent, see FIG. 6).

The technology described above optimizes the segment virtualization model, which cannot manipulate every original VM table as a native table. Therefore, models always using original VM tables should be launched with a general segment virtualization scheme, where emulated segment register loaded uses table set 236A, but during native guest code execution, guest GDT/LDT are loaded into the real CPU.

FIG. 4 summarizes the process of mapping a new descriptor. In FIG. 4, element 492 is an optimization structure, which helps in selecting which of the groups of tables (494) is selected, based on the current privilege level that the guest code thinks it has. If the guest code is not using every possible privilege level (of the 4 that are possible in the INTEL architecture), then only some of the groups of tables will be mapped, and others will be unallocated (and may never be allocated).

As further shown in FIG. 4, the guest descriptor mapping routine of 484 has two important elements—generation of the guest descriptor (see 486) which corresponds to some value of the descriptor that the guest code believes is correct (for example, in the INTEL architecture, an 8 byte value), and translation of that descriptor to a "mapped descriptor" (see element 486, which takes into account the ring compression phenomenon). The descriptor modification process 488 will use one of the set of tables 494(0)-494(3))—each of which represents a grouping of two tables, an LDT and a GDT. The choice of the group 494(0)-494(3) depends on the current privilege level (CPL) that the guest code requests, or thinks it is using. For example, if the guest code is using only two privilege levels—ring 0 for the guest OS, and ring 3 for the user application code, then only two sets of tables needs to be used—in this case, set 494(0) and 494(3). It will again be remembered that all of the guest code is executed in ring3, regardless of which CPL the guest code thinks it is using.

If the guest code is using all four rings, ring0-ring3, then all four groups of tables will be allocated—in other words, there will be a total of 8 tables, counting both GDT and LDT—236B-236E, and 238B-238E, see discussion earlier regarding FIG. 2.

Using the example of the guest CPL being ring 0, and the "real" CPL of the guest code being 3, it is necessary to translate the descriptors in both the GDT and the LDT from ring 0 to ring 3, which is what is shown in FIG. 4. Note also that the guest code will attempt to load a descriptor with a descriptive privilege level (DPL) of zero into any of the segment registers register. Since there is a mismatch between the privilege level of the descriptor (0) and the privilege ring (ring 3) in which the guest code is executing, this will raise an exception. Thus, the simplest way to deal with this is by placing the same descriptor into the appropriate table (236B, 238B, etc.), but with a modified descriptor privilege level (DPL), in this case, modified from 0 to 3. In this case, only the two bits that correspond to the descriptor privilege level need to be changed. In effect, since there is, in reality, only one privilege level available to the guest code, in the preferred embodiment, this has to be compensated for by the use of four separate sets of tables.

The guest descriptor mapping routine 484 is invoked when the guest code attempts to update the shadow descriptor by loading a new value into the segment register that has not been mapped yet—this will trigger either a segment Not Present fault, or a stack fault exception, at which point the VMM will detect that this event has occurred and will need to invoke the guest descriptor mapping routine 484.

FIG. 5 illustrates the process of mapping a descriptor, in view of the caching structures described earlier with reference to FIG. 3. In the upper right of FIG. 5 is one of the GDTs discussed earlier, for example, GDT 236B (although the discussion is applicable to all the GDTs 236B-E, and equally to the LDTs 238B-E). The objective is to place a proper entry into the GDT 236B, with the appropriate selectors, so that the guest code can execute natively in the future, without raising exceptions. The first step is to use the direct access cache 358 to check whether this descriptor really is not yet mapped. For example, consider element 502, with the VMM determines that the pointer in this case is 0, in other words, that the descriptor really is not mapped, and that the descriptor therefore needs to be mapped. Then, using the cache 355, the VMM determines whether the page where that descriptor belongs has ever been used before and therefore, whether it is present. For example, in this figure, this would be the first descriptor on that page, in other words, the page is not mapped yet, and its presence bit is set to 0. Since this is the first time that page has been accessed, a structure 352 is allocated to it. Also, a corresponding entry is made in the structure 355. Then, a new element 366 is added, which references the descriptor. (See discussion of the structure 366 with reference to FIG. 3). In essence, the information in other structure 366 corresponds to the cached descriptor value. Then, element 502 can now point to the newly mapped descriptor in the GDT 236B and ultimately, the descriptor itself is written into the GDT 236B, see element 370.

Element 504 in FIG. 5 is an optimization structure for quick utilization of the caching scheme. Consider a situation where an instruction MOV DS, AX is encountered. This moves a selector value, contained in the register AX, to the segment register DS. The selector is a 16 bit value. The first two bits, 0 and 1, are referred to as RPL—requested privilege level. The requested privilege level can only be no more privileged than the current privilege level—in other words, the requested privilege level can only be requested in the direction of less privileged. If the code is running in ring 0, then RPL can request any of 1, 2, and 3 rings.

The TI bit, which is bit 2, defines whether this selector refers to a descriptor in the LDT or the GDT. The remaining bits, bits 3-15, are an index in the table—i.e., in either the LDT or the GDT. By combining bits 3-15 with bit 2, a unified index into the direct access cache structure 358 can be implemented, such that alternating elements of the structure 358 point to the GDT, and alternating elements point to the LDT—in other words, the pointers are interleaved. In other words, by simply ignoring the 2 RPL bits, an index into the cache structure 358 can be easily obtained, and then to the actual descriptor in the GDT or LDT.

FIG. 6 illustrates the structure 239, first discussed with reference to FIG. 2 above, which relates to the emulation mode and which specifies registers need to be emulated, and which ones do not. Note that in some of the mode, the descriptors are not mapped (see the second column in FIG. 6), while in others, they are mapped. Furthermore, depending on the mode, different registers can be operated on in their native mode. For example, in the native emulation mode with descriptor mapping, where the current privilege level is 0, the segment registers ES, DS, FS and GS can be operated on by instructions in the native mode. The segment registers CS and FS need to be emulated—in other words, if the guest code were to attempt to change the values of the CS and FS registers, this would trigger an exception. Note also that when switching from one mode to another, for example, from the native segment emulation mode with CPL equals 0, to the next illustrated mode, where descriptors are mapped, for any PM mode (protected execution mode, or protected mode), the set of emulated registers is different—the register GS is now also emulated. Note that if the guest code were to attempt to switch the modes, the VMM needs to intercept that, because it can imply a different segment emulation model.

The VMM described herein can effectively operate with existing hardware virtualization technologies, such as INTEL VMX technology, including Vanderpool Technology for IA-32 Processors (VT-x) and Vanderpool Technology for INTEL Itanium Architecture (VT-i). The IA-32 INTEL Architecture Software Developer's Manuals, Volumes 1-3, see http://www.INTEL.com/design/pentium4/manuals/index_new.htm#1, and the INTEL Itanium Architecture Software Developer's Manuals, Volumes 1-3, see http://www.INTEL.com/design/itanium2/documentation.htm#manuals, which are incorporated herein by reference in their entireties, provide detailed discussions of the INTEL VMX technology. Also, technologies and processors and chipsets from other manufacturers, such as AMD (Pacifica), MOTOROLA and so on can support the VMM approach described herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for managing memory in a computer running a Virtual Machine, the system comprising:
    a host operating system having kernel mode privileges;
    a Virtual Machine having user mode privileges and having a guest table identifying memory segments; and
    a Virtual Machine Monitor having kernel mode privileges and that maintains a dynamically mapped table of pointers to segments identified by the guest table,
    wherein the computer uses the dynamically mapped table to address Virtual Machine memory.

2. The system of claim 1, wherein the Virtual Machine Monitor maintains a plurality of dynamically mapped tables of pointers, each table corresponding to a particular privilege level of the processor.

3. The system of claim 2, wherein a segment virtualization model uses one set of tables and other dynamically mapped tables correspond to pointer mapping emulation model of segment-based memory addressing.

4. The system of claim 1, wherein an exception handler is invoked to handle an attempt to use an unmapped pointer.

5. The system of claim 1, wherein the dynamically mapped table is initialized with pointers that point to Not Present segments.

6. The system of claim 5, wherein entries to the dynamically mapped table are added only when the Virtual Machine attempts to use a corresponding segment.

7. The system of claim 1, entries to the dynamically mapped table are added only when the Virtual Machine attempts to use a corresponding segment.

8. The system of claim 1, wherein the guest table includes a global descriptor table used by guest operating system code of the Virtual Machine, and a local descriptor used by user application code of the Virtual Machine, and wherein the dynamically mapped table includes a first corresponding table with dynamically mapped global descriptors and a second corresponding table with dynamically mapped local descriptors.

9. The system of claim 1, wherein the Virtual Machine uses the local descriptor table for user application only, and the Virtual Machine's LDT can be loaded directly to the real processor.

10. The system of claim 1, wherein the Virtual Machine's operations affecting segment registers are executed in a native mode.

11. The system of claim 1, wherein the Virtual Machine's operations affecting the guest table are executed in a native mode.

12. The system of claim 1, wherein the dynamically mapped table is mapped on a page-wise basis.

13. The system of claim 1, wherein the pointers in the dynamically mapped table have no higher privilege than corresponding pointers in the guest table.

14. A method of emulating segment addressing by a processor, comprising:

initiating a Virtual Machine Monitor in a kernel mode;

initiating a Virtual Machine in a user mode;

forming a dynamically mapped table in Virtual Machine Monitor space, the dynamically mapped table corresponding to a table of segment descriptors of the Virtual Machine;

populating the dynamically mapped table with descriptors that raise exceptions upon an attempt by the Virtual Machine to address a corresponding segment; and mapping a descriptor to the dynamically mapped table upon the Virtual Machine's use of that descriptor.

15. The method of claim 14, wherein the Virtual Machine Monitor maintains a plurality of dynamically mapped tables of pointers, each table corresponding to a particular privilege level of the processor.

16. The method of claim 14, wherein an exception handler is invoked to handle an attempt to use an unmapped pointer.

17. The method of claim 14, wherein the dynamically mapped table is initialized with pointers that point to Not Present segments.

18. The method of claim 17, wherein entries to the dynamically mapped table are added only when the Virtual Machine attempts to use a corresponding segment.

19. The method of claim 14, wherein the guest table includes a global descriptor table used by guest operating system code of the Virtual Machine, and a local descriptor used by user application code of the Virtual Machine, and wherein the dynamically mapped table includes a first corresponding table with dynamically mapped global descriptors and a second corresponding table with dynamically mapped local descriptors.

20. The method of claim 14, wherein the Virtual Machine's operations affecting segment registers are executed in a native mode.

21. The method of claim 14, wherein the Virtual Machine's operations affecting the guest table are executed in a native mode.

22. The method of claim 14, wherein the dynamically mapped table is mapped on a page-wise basis.

23. The method of claim 14, wherein the pointers in the dynamically mapped table have no higher privilege than corresponding pointers in the guest table.

* * * * *